(12) United States Patent
Krebs et al.

(10) Patent No.: US 10,107,669 B2
(45) Date of Patent: Oct. 23, 2018

(54) LIQUID LEVEL SENSOR WITH INSULATING REGION OVER THE PROBE FOOT

(71) Applicant: AIRBUS HELICOPTERS DEUTSCHLAND GMBH, Donauworth (DE)

(72) Inventors: Peter Krebs, Ludwigsburg (DE); Holger Mendick, Donauworth (DE); Sven-Carsten Vogler, Gersthofen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 179 days.

(21) Appl. No.: 15/230,827

(22) Filed: Aug. 8, 2016

(65) Prior Publication Data

US 2017/0045391 A1 Feb. 16, 2017

(30) Foreign Application Priority Data

Aug. 13, 2015 (EP) .................................. 15400038

(51) Int. Cl.
*G01F 23/26* (2006.01)

(52) U.S. Cl.
CPC .................................. *G01F 23/268* (2013.01)

(58) Field of Classification Search
None
See application file for complete search history.

(56) References Cited

U.S. PATENT DOCUMENTS

| 2,848,666 A | 8/1958 | Zito | |
| 2,941,403 A * | 6/1960 | Steenfeld | G01F 23/268 |
| | | | 73/302 |
| 3,010,319 A * | 11/1961 | Sontheimer | G01F 23/263 |
| | | | 318/642 |
| 4,457,170 A * | 7/1984 | Thrift | G01F 23/268 |
| | | | 244/135 R |
| 4,924,702 A | 5/1990 | Park | |
| 5,187,979 A * | 2/1993 | Edmark, III | G01F 23/263 |
| | | | 141/115 |

FOREIGN PATENT DOCUMENTS

| DE | 9218364 | 1/1994 |
| DE | 19757924 | 7/1997 |
| FR | 1099638 | 9/1955 |
| GB | 2142145 | 1/1985 |
| JP | 2010210269 | 9/2010 |
| WO | 0216888 | 2/2002 |

OTHER PUBLICATIONS

Extended European Search Report for European Application No. EP 15400038.4, Completed by the European Patent office, dated Apr. 4, 2016, 8 Pages.

* cited by examiner

*Primary Examiner* — Paul West
*Assistant Examiner* — Mark A Shabman
(74) *Attorney, Agent, or Firm* — Brooks Kushman P.C.

(57) ABSTRACT

A liquid level sensor comprising an inner capacitor tube, an outer capacitor tube and a probe foot suitable for placing the liquid level sensor on a bottom surface of a liquid tank, wherein a capacitor region arranged to hold a liquid is defined between the outer capacitor tube and the inner capacitor tube, and wherein an insulating minimum distance is left between the inner capacitor tube base and the probe foot, the insulating minimum distance being sufficient to prevent a droplet of water on the probe foot from making contact with the inner capacitor tube.

20 Claims, 3 Drawing Sheets

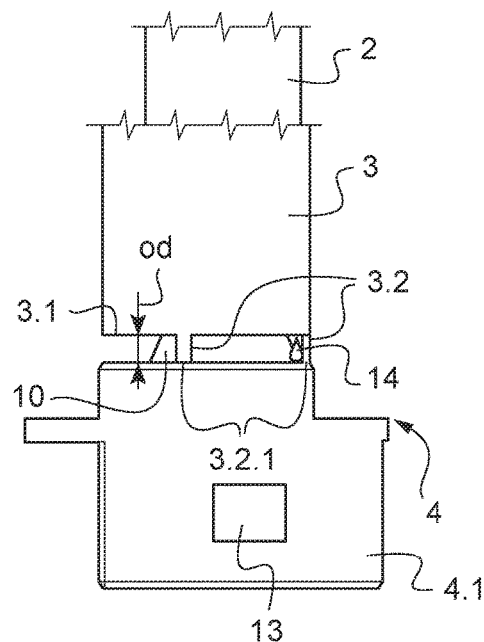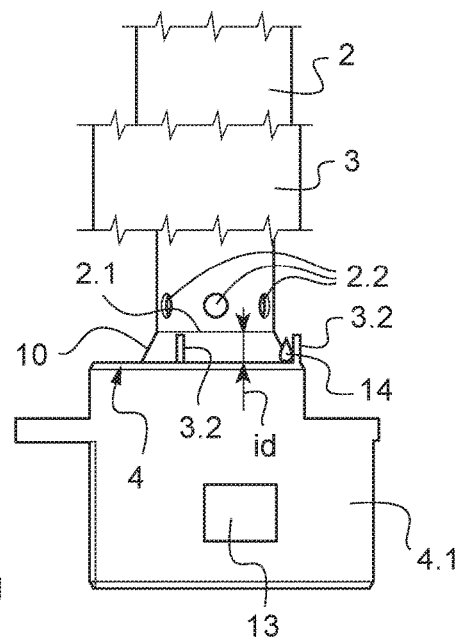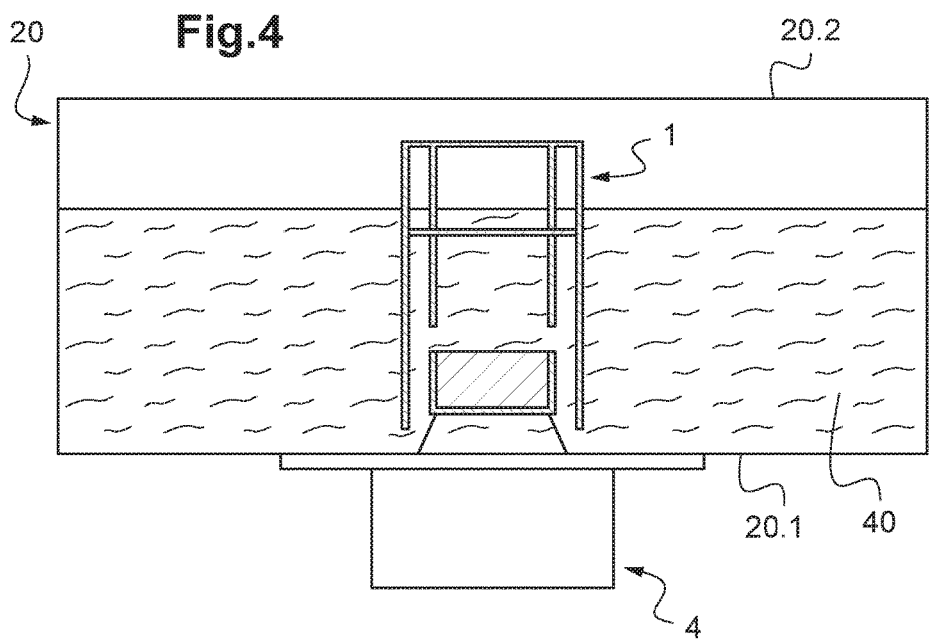

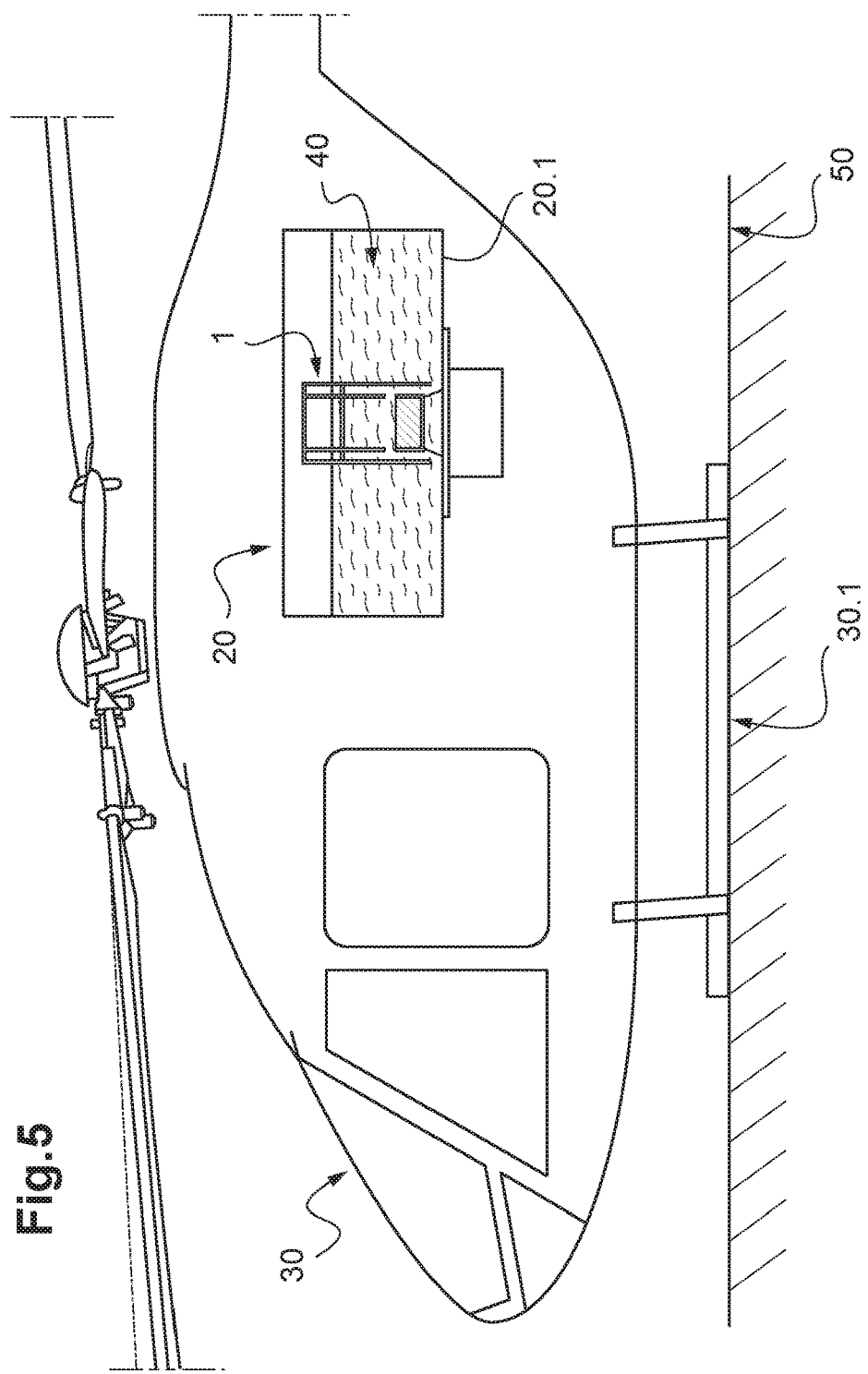

LIQUID LEVEL SENSOR WITH INSULATING REGION OVER THE PROBE FOOT

CROSS-REFERENCE TO RELATED APPLICATIONS

This application claims priority to European patent application No. EP 15400038.4 filed on Aug. 13, 2015, the disclosure of which is incorporated in its entirety by reference herein.

BACKGROUND OF THE INVENTION (1) Field of the Invention

The present invention belongs to the field of liquid level sensors in which the liquid level within a tank is measured as a function of the capacitance between a pair of tubes when the liquid is within the region defined by the tubes.

(2) Description of Related Art

This type of sensors is well-known in the art and it can normally be grouped in two categories—that of the sensors installed at the bottom part of the tank and that in which the sensors are fixed with clamps inside the tank, being open on their top and bottom sides. The latter category presents the disadvantage of requiring the installation of electronic components, such as wiring, at the inside of the tank, that is, in the volume that can be filled with the liquid, e.g. fuel, which can give rise to problems of energy induction in the tank.

The sensors intended for being placed on a bottom surface of a tank normally comprise a probe foot by means of which the sensors are held on such surface. The sensors' electronic equipment can then be mounted within the probe foot, which is in turn electronically connected to the tubes of the sensor.

Document WO200216888 discloses an example of such sensor. A pair of upright tubes extends from a probe foot in such a way that the volume between the tubes can act as a capacitor. The outer tube comprises a series of draining holes at the region closer to the probe foot, so that the liquid can enter the capacitor volume through these holes. The bases of both of the capacitor tubes are located directly on the probe foot, as a consequence of which a trapping area is formed at the zone of the capacitor volume between the probe foot and the draining holes. If contaminants reach this trapping area, their evacuation may be difficult and may require disassembling the sensor. Moreover, this position of the bases of the tubes makes that the capacitor region starts immediately over the probe foot, as a consequence of which the presence of a droplet of water on the probe foot may result in a variation of the capacitance of the capacitor volume, and thus of the sensed liquid level.

The document U.S. Pat. No. 5,187,979 describes a probe for monitoring various attributes of a fuel, such as aviation fuel, that is contained in a storage vessel or tank. To monitor contaminants such as water in the fuel, is maintained within a vessel a conductive tank sensor member at least partially immersed in the fuel and maintaining a tank sensor member in position to form a capacitance with the fuel. A second conductive member such as a metal vessel or ground is provided for determining the magnitude of the capacitance so formed. Then, by comparing the magnitude lastly determined with a previously determined magnitude associated with substantially uncontaminated fluid, is determined the presence or absence of a contaminant in the fluid.

The document JP2010210269 describes an air bubble mixing ratio sensor for detecting such ratio with precision, in an oil level detector for an oil pan. The oil level detector includes a capacitor having a voltage applying electrode and an earth electrode. At a bottom part of the oil pan, is provided an insulating part. An electrostatic capacity calculating circuit calculates the electrostatic capacity of the capacitor on the basis of the output signal outputted corresponding to the change of a dielectric constant in the oil interposed in a diametric gap of the capacitor. A memory stores an air bubble mixing ratio map and an air bubble mixing ratio calculating circuit determines the air bubble mixing ratio on the basis of the electrostatic capacity as well as the air bubble mixing ratio map stored in the memory.

The document GB2142145 describes a liquid level sensor comprising a capacitor comprising a pair of spaced-apart plates by an insulating disk. The spaced-apart plates extend over the level range to be sensed, and a capacitance measuring device is connected to the capacitor. The capacitor plates are coaxial and an outer plate is earthed. A hollow cylinder housing the sensor is closed, but a few small holes are provided near the top and bottom of the cylinder to allow restricted access of liquid to the interior. The restricted access cuts down surge effects which might be encountered when a liquid tank is carried on a vehicle.

Other documents were considered i.e. DE9218364, DE19757924, FR1099638, U.S. Pat. No. 2,848,666 and U.S. Pat. No. 4,924,702.

BRIEF SUMMARY OF THE INVENTION

The present invention provides a liquid level sensor suitable for being installed at the bottom part of a tank wherein the commented disadvantages of the difficulty of cleaning out the contaminants and the inaccurate sensed level when a droplet of water is on the foot of the sensor are minimized or overcome.

To achieve so, the liquid level sensor of the invention comprises an inner capacitor tube, an outer capacitor tube and a probe foot suitable for placing the liquid level sensor on a bottom surface of a liquid tank, the inner and outer capacitor tubes respectively extending upwardly relative to the probe foot from an inner capacitor tube base and an outer capacitor tube base in such a way that a capacitor region arranged to hold a liquid is defined between the outer capacitor tube and the inner capacitor tube, the inner capacitor tube being located at the inside of the outer capacitor tube.

An insulating minimum distance is left along the elevation direction of the sensor, between the inner capacitor tube base and the probe foot, the capacitor region and the probe foot being thereby separated by such insulating minimum distance, the insulating minimum distance being sufficient to prevent a droplet of water on the probe foot from making contact with the inner capacitor tube.

The inner and the outer capacitor tubes define, as is typical in capacitor sensors, a capacitor region between the tubes, the capacitor region being arranged to hold a fluid serving as dielectric between the tubes so that the capacitance of this capacitor region is dependent on the dielectric constant of the fluid and on the fluid level. Hence, for a given fluid, each value of the capacitance of the capacitor region can be associated to a value of the fluid level. This measurement technique is well known in the art and explained in many prior art documents, some as old as document U.S. Pat. No. 2,848,666, filed in 1955.

The level liquid sensor comprises a probe foot that enables the sensor to be placed on the bottom surface of the liquid tank. The bottom surface is the surface of the tank arranged for being first completely covered by the liquid when the tank is filled, as is explained below in this document.

The present invention is advantageous in that the liquid level sensor is designed to leave a given distance between the capacitor region and the probe foot, as a consequence of the insulating minimum distance between the inner capacitor tube base and the probe foot; in other words, since the capacitor region only extends between the inner capacitor tube and the outer capacitor tube, and the inner capacitor tube is not directly attached to the probe foot, the insulating minimum distance between the inner capacitor tube and the probe foot gives rise to an insulating region between the probe foot and the capacitor region defined by such insulating minimum distance, even in the embodiments wherein the outer capacitor tube is directly attached to the probe foot or closer to the probe foot than the inner capacitor tube.

The insulating minimum distance is chosen to prevent a droplet of water on the probe foot from making contact with the inner capacitor tube.

One common problem of liquid level sensors suitable for being located on the bottom surfaces of a tank is that water and other contaminants may accumulate on the probe foot; a droplet of water lying on the probe foot may thus be in between the capacitor tubes, that is, within the capacitor region. If this happens, the capacitance of the capacitor region varies, leading to an incorrect measure of the fluid level. This problem is overcome in the present invention by means of the insulating region resulting from the insulating minimum distance. The definition of this distance does not suppose any burden for a person skilled in the art of mechanics of fluids, who is able to determine the shape and volume of a certain fluid's drop depending on the kind of surface on which the fluid lies and on additional parameters, such as the temperature.

In some embodiments, the outer capacitor tube base is either directly attached to the probe foot or closer to the probe foot than the inner capacitor tube base. In such cases, a droplet of water lying on the probe foot may be in contact with the outer capacitor tube. Nevertheless, since the insulating minimum distance is dimensioned in such a way that the droplet of water cannot reach the height of the inner capacitor tube, the droplet of water is not within the capacitor region and the capacitance is therefore not affected.

In an embodiment, the insulating minimum distance is equal to or greater than 6 mm. This distance has been proven sufficient to achieve the explained objective of keeping a water droplet lying on the foot probe from contacting the inner capacitor tube.

The outer capacitor tube can be attached to the inner capacitor tube by means of at least one transversal insulating means which crosses the inner capacitor tube. These transversal insulating means are non-conducting structures which do not vary the capacitance of the capacitor region in spite of extending across this region.

The inner capacitor tube may comprise at least one draining hole facing the outer capacitor tube, such that the liquid can enter the inside of such inner capacitor tube. The provision of this at least one draining hole makes less expensive the manufacturing of the inner capacitor tubes, which otherwise would have to be sealed.

The inner capacitor tube base may completely close the inner capacitor tube at its end closer to the probe foot in such a way that an inner capacitor tube trap is defined at the inside of the inner capacitor tube between the inner capacitor tube base and the at least one draining hole. The inner capacitor tube trap can be filled with a filling material for keeping liquids and particles from being retained therein. This example allows for the commented easier manufacturing of the inner capacitor tube while avoiding the problem of the difficulty of getting rid of the contaminants that may get inside the inner capacitor tube trap.

The inner capacitor tube base may be attached to the foot probe by means of an insulating spacer located in the insulating region. The insulating spacer allows for an attachment of the inner capacitor tube to the probe foot which complies with the condition that an insulating minimum distance separates the inner capacitor tube and the probe foot, for the spacer is made of an insulating material—a droplet of water on the probe foot and in contact with the conical insulating spacer would not alter the liquid level determined by the liquid level sensor, because the spacer is a non-conducting piece different from the inner capacitor tube and hence the droplet of water would not be within the capacitor region.

The insulating spacer may have a conical shape, which helps to evacuate the contaminants from the probe foot.

Likewise, the outer capacitor tube base may comprise a plurality of beams, each beam having a beam base attached to the probe foot, the plurality of beam bases thereby constituting the outer capacitor tube base, and each beam leaving a space with the adjacent beams for allowing the liquid to enter the capacitor region.

Therefore, the part of the outer capacitor tube closer to the probe foot is formed, in this embodiment, by multiple beams attached to the probe foot and between which the liquid can enter the capacitor region. The term "adjacent beams" must be construed as consecutive beams when following the perimeter of the outer capacitor tube.

Moreover, the space between adjacent beams is beneficial in that no trapping areas are formed in the region of the liquid sensor closer to the probe foot—the contaminants that may remain on the probe foot can be easily cleared out through this space between adjacent beams.

As is explained above, even if, in this embodiment, the outer capacitor tube base is in contact with the probe foot, the capacitor region is separated from the probe foot by the insulating minimum distance, and therefore a droplet of water touching one of the plurality of beams does not influence the calculated liquid level.

In an alternative embodiment to that of the previous paragraphs, the outer capacitor tube base and the probe foot are separated by an outer minimum distance. This embodiment enhances the easy removal of contaminants from the surface of the probe foot. In order to hold the outer capacitor tube, this tube can be attached to the inner capacitor tube by means of the at least one transversal insulating means. In this embodiment, no element joins directly the outer capacitor tube to the probe foot, and the electrical connection between the outer capacitor tube and the electronic means for determining the capacitance of the capacitor region may be done via insulated cables.

The at least one transversal insulating means linking the inner capacitor tube and the outer capacitor tube can also be used to hold the inner capacitor tube in those embodiments wherein there is no insulating spacer attaching the inner capacitor tube and the probe foot. The outer capacitor tube of this embodiment can also be attached to the probe foot by the beam bases of the plurality of beams, and the electrical connection between the inner capacitor tube and the electronic means may be done with insulated cables.

In an example of the embodiment wherein a minimum outer distance is defined, the insulating minimum distance and the outer minimum distance have the same value and the inner and outer capacitor tubes are concentric cylinders. The cross sections of these concentric cylinders may be circular and, accordingly, the insulating region between the probe foot and the capacitor region may be a cylinder of circular cross-section limited by the imaginary extension of the outer capacitor tube between the outer capacitor tube base and the probe foot, the cylinder having a height equal to the insulating minimum distance.

In the embodiment wherein the outer minimum distance is equal to the insulating minimum distance, a droplet of water on the probe foot cannot contact the outer capacitor tube base either.

The probe foot may comprise at its inside part a housing which in turn comprises the electronic means for determining the capacitance of the capacitor region and thus the liquid level. The electronic means are electronically connected to the inner capacitor tube and to the outer capacitor tube so that the liquid level is determined as a function of the capacitance between the tubes. The electronic means capable of performing these calculations well-known in the prior art are applicable to the present invention. This embodiment is advantageous in that the housing protects the electronic components of the electronic means from the liquid whose level is measured when the liquid level sensor is in a tank filled with liquid. Otherwise, problems associated to the energy induced by the components in the tank could arise.

A further aspect of the invention covers a liquid tank comprising any of the above-described liquid level sensors. The liquid tank extends in the elevation direction from a bottom surface up to a top level area, the bottom surface being the surface of the liquid tank to be first covered with the liquid when the liquid is introduced in the liquid tank; the probe foot is located on the bottom surface. The explained advantages of the liquid level sensor of the present invention extend to the liquid tank comprising the sensor.

In the definition of the term "bottom surface", the expression "surface of the liquid tank to be first covered with the liquid when the liquid is introduced in the liquid tank" must be interpreted as the surface to be first covered when the tank is filled in a conventional manner according to its design. For instance, if the tank is installed in a car, the bottom surface of the tank is the surface of the tank to be first covered when the car is on its four wheels, and the wheels are on a planar surface without any slopes. If it is a fixed tank in an industrial area, the bottom surface is the first surface to be covered in the mounted position of the tank. The example of an aircraft is explained below.

The liquid tank can be a fuel tank, in which case the liquid level sensor is advantageously used for accurately determining the level of fuel within the tank without the sensed level being affected by the droplet of waters that may accumulate on the probe foot.

Such fuel tank can be installed in an aircraft, the bottom surface being, following the explanations given above, the surface of the fuel tank closer to an extended landing gear of the aircraft in the elevation direction of the aircraft. The term "extended landing gear" must be understood as the parts of the aircraft intended for first touching the ground during a conventional landing when the aircraft is ready for landing. The elevation direction of an aircraft can be defined as the axis of the longitudinal mid-plane of the aircraft which is perpendicular to the longitudinal direction of the aircraft. The aircraft can be a rotorcraft.

BRIEF DESCRIPTION OF THE SEVERAL VIEWS OF THE DRAWINGS

These and other features and advantages of the invention will become more evident from the following detailed description of preferred embodiments, given only by way of illustrative and non-limiting example, in reference to the attached figures:

FIG. 2 represents a liquid level sensor wherein an outer capacitor tube comprises a plurality of beams for its attachment to the probe foot.

FIG. 3 illustrates the embodiment of FIG. 2, but part of the outer capacitor tube has not been depicted so that the corresponding part of the inner capacitor tube can be seen.

FIG. 4 shows a liquid tank containing a liquid, wherein the liquid level sensor is installed on the bottom surface of the tank.

FIG. 5 depicts a rotorcraft comprising the liquid tank of FIG. 4.

DETAILED DESCRIPTION OF THE INVENTION

Figure 1:
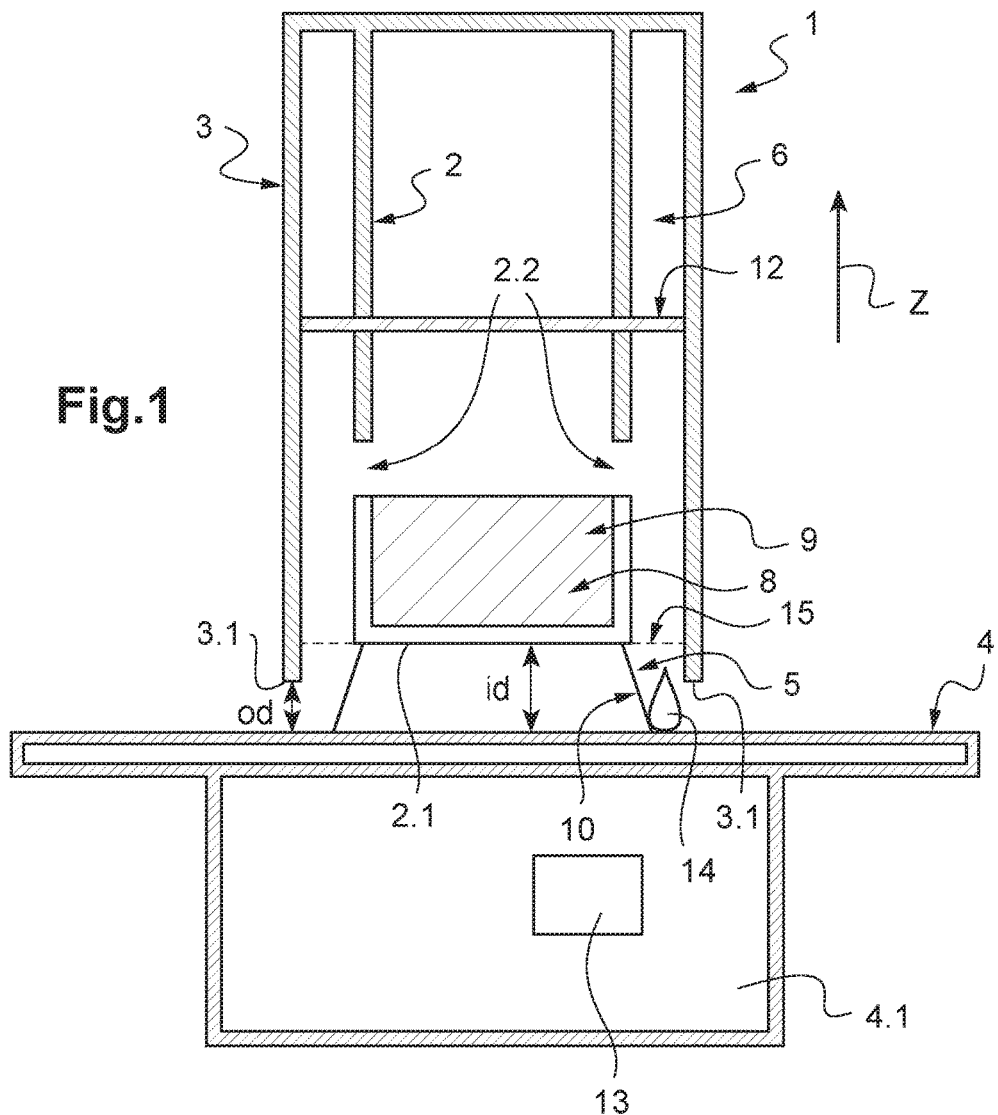
FIG. 1 shows a liquid level sensor wherein an insulating minimum distance separates an inner capacitor tube base from a probe foot suitable for placing the liquid level sensor on a bottom surface of a liquid tank.

FIG. 1 shows a liquid level sensor 1 comprising an outer capacitor tube 3 and an inner capacitor tube 2 between which a capacitor region 6 is defined. The inner capacitor tube base 2.1 and the probe foot 4 are separated by an insulating minimum distance id, along an elevation direction X. Likewise, the outer capacitor tube base 3.1 and the probe foot 4 are separated by an outer minimum distance od, which in the present embodiment is inferior to the insulating minimum distance id. However, since the capacitor region 6 is exclusively comprised between the inner capacitor tube 2 and the outer capacitor tube 3, the distance between the capacitor region 6 and the probe foot 4 is equal to the insulating minimum distance id; thus, an insulating region 5 extends between the capacitor region 6 and the probe foot 4, and a limit area 15 representing the frontier between the capacitor region 6 and an insulating region 5 is thereby the insulating minimum distance away from the probe foot 4.

In this embodiment, the outer capacitor tube 3 is attached to the inner capacitor tube 2 by means of a transversal insulating means 12 which crosses the inner capacitor tube 2 and the capacitor region 6. Hence, the space between the outer capacitor tube base 3.1 and the probe foot 4 is free of any element which could hinder the evacuation of contaminants on the probe foot 4.

In the embodiment of FIG. 1, the inner capacitor tube base 2.1 closes completely the inner capacitor tube 2 at its end closer to the probe foot 4. Besides, the inside of the inner capacitor tube 2 is opened to the capacitor region 6 through two draining holes 2.2 facing the outer capacitor tube 3, such that the liquid 40 can enter the inside of such inner capacitor tube 2.

Therefore, an inner capacitor tube trap 8 is defined at the inside of the inner capacitor tube 2 between the inner capacitor tube base 2.1 and the two draining holes 2.2. In order to keep liquids and particles from being retained inside the inner capacitor tube trap 8, the inner capacitor tube trap 8 is filled, in the embodiment of FIG. 1, with a filling material 9.

In this embodiment, the inner capacitor tube 2 is attached to the probe foot 4 by means of a conical insulating spacer 10. Since the conical insulating spacer 10 extends continuously from the inner capacitor tube base 2.1 to the probe foot 4, the liquid 40 can enter the capacitor region 6 through the open area between the outer capacitor tube base 3.1 and the probe foot 4 and through the limit area 15, but the liquid 40 is kept from reaching the zone of the insulating region 5 defined between the probe foot 4, the inner capacitor tube base 2.1 and the conical insulating spacer 10. This configuration improves the technical advantage of impeding the accumulation of contaminants inside trapping areas of the liquid level sensor 1.

In FIG. 1, a droplet of water 14 lies on the probe foot 4. Since the insulating minimum distance id has been dimensioned appropriately, the droplet of water 14 cannot contact the inner capacitor tube 3, and thus the capacitance of the capacitor region 6, and accordingly the sensed liquid level, are not affected by the presence of the droplet of water 14, even if the droplet 14 touched the outer capacitor tube 3 or the conical insulating spacer 10.

The probe foot 4 of the embodiment of FIG. 1 comprises a housing 4.1 which contains the electronic means 13 for determining the capacitance of the capacitor region 6 and the liquid level. This configuration allows for the isolation of these electronic means 13 from the liquid 40 of a tank 20 when the probe foot is installed on the bottom surface 20.1 of such tank 20.

In the embodiment of FIG. 2, the outer capacitor tube 3 comprises a plurality of beams 3.2, which form the bottom part of the outer capacitor tube 3, according to the reference of the figure; resultantly, the outer capacitor tube 3 is connected to the probe foot 4 by means of such plurality of beams 3.2, each beam 3.2 having a beam base 3.2.1 attached to the probe foot 4. For this reason, the plurality of beam bases 3.2.1 constitutes the outer capacitor tube base, and the outer minimum distance od is zero, in the present example. Moreover, the plurality of beams 3.2 are sufficiently separated from one another so as to permit the easy evacuation of contaminants resting on the probe foot 4, that is, the beams 3.2 do not form trapping areas within the liquid level sensor 1. The liquid to be measured, in turn, can access to the capacitor region 6 though such separations between the plurality of beams 3.2 and through the limit area 15.

As in the embodiment of FIG. 1, the insulating minimum distance id is sufficient to avoid that a droplet of water 14 lying on the probe foot 4 contacts the inner capacitor tube 2. As is depicted in FIG. 2, the droplet of water 14 can however contact one of the plurality of beams 3.2 or the conical insulating spacer 10. In any case, similarly to what have been explained above, this fact is not prejudicial for the accuracy of the sensed liquid level, since the distance between the capacitor region 6 and the probe foot 4 is determined by the insulating minimum distance id.

FIG. 3 illustrates the same embodiment of FIG. 2, but the outer capacitor tube 3 is only partially shown so that the region of the inner capacitor tube 2 hidden by the outer capacitor tube 3 in FIG. 2 can be seen. Concretely, three draining holes 2.2 are depicted in FIG. 3; as a consequence of the presence of these draining holes 2.2, the liquid 40 to be measured can enter the inside of the inner capacitor tube 2.

The embodiment of FIGS. 2 and 3 is similar to that of FIG. 1 in terms of the configuration of the probe foot 4, which also comprises a housing 4.1 lodging the electronic means 13, and of the attachment of the inner capacitor tube 2, which uses a conical insulating spacer 10. Likewise, the inner 2 and outer 3 capacitor tubes are also concentric cylinders of circular cross section.

In FIG. 4, a tank 20 comprising the liquid level sensor 1 extends in the elevation direction from a bottom surface 20.1 up to a top level area 20.2, the bottom surface 20.1 being the surface of the liquid tank 20 to be first covered with the liquid 40 when the liquid 40 is introduced in the liquid tank 20, as can be appreciated in the figure. The probe foot 4 is located on the bottom surface 20.1, and thus the liquid level sensor 1 extends upwardly within the tank 1 from this bottom surface 20.1. The liquid 40 fills the capacitor region 6 up to a given level that will be determined as a function of the capacitance. The liquid level sensor 1 of this embodiment is the same as that of the embodiment of FIG. 1, so all the references of that figure apply.

FIG. 5 shows a rotorcraft 30 comprising the liquid tank 20 of FIG. 4; hence, the references of FIGS. 1 and 4 are valid for this embodiment. The bottom surface 20.1 of the tank 20 is the surface of the tank 20 closer to the extended landing gear 30.1 of the rotorcraft 30, that is, the surface to be first covered by the liquid 40—fuel in this case–when the tank 20 is filled and the rotorcraft 30 rests, supported by the landing gear 30.1, on a non-inclined planar surface 50, as in the example of the figure.

REFERENCES

1.—Liquid level sensor
2.—Inner capacitor tube
2.1.—Inner capacitor tube base
2.2.—Draining holes
3.—Outer capacitor tube
3.1.—Outer capacitor tube base
3.2.—Beams
3.2.1.—Beam bases
4.—Probe foot
4.1.—Housing
5.—Insulating region
6.—Capacitor region
8.—Inner capacitor tube trap
9.—Filling material
10.—Insulating spacer
12.—Transversal insulating means
13.—Electronic means
14.—Droplet of water
15.—Limit area
20.—Liquid tank
20.1.—Bottom surface
20.2.—Top level area
30.—Aircraft
30.1.—Landing gear
40.—Liquid
50.—Non-inclined planar surface
id.—Insulating minimum distance
od.—Outer minimum distance

What is claimed is:

1. A liquid level sensor for a fuel tank in an aircraft, the liquid level sensor comprising an inner capacitor tube, an outer capacitor tube and a probe foot suitable for placing the liquid level sensor on a bottom wall of the fuel tank, the inner and outer capacitor tubes respectively extending upwardly relative to the probe foot from an inner capacitor tube base and an outer capacitor tube base in such a way that a capacitor region arranged to hold a liquid is defined between the outer capacitor tube and the inner capacitor tube, the inner capacitor tube being located at an inside of the outer capacitor tube, wherein an insulating minimum distance (id) along an elevation direction of the liquid level sensor is left between the inner capacitor tube base and the probe foot, the capacitor region and the probe foot being thereby separated by such insulating minimum distance (id), the insulating minimum distance (id) being sufficient to prevent a droplet of water on the probe foot from making contact with the inner capacitor tube, and wherein the inner capacitor tube base completely closes the inner capacitor tube at an end in such a way that an inner capacitor tube trap is defined at an inside of the inner capacitor tube between the inner capacitor tube base and the at least one draining hole defined in a wall of the inner capacitor tube, the inner capacitor tube trap being filled with a filling material for keeping liquids and particles from being retained therein.

2. The liquid level sensor of claim 1, wherein the inner capacitor tube comprises at least one draining hole facing the outer capacitor tube such that the liquid can enter the inside of the inner capacitor tube.

3. The liquid level sensor according to claim 1, wherein the inner capacitor tube base is attached to the probe foot by means of an insulating spacer located in an insulating region defined between the probe foot and the inner capacitor tube base.

4. The liquid level sensor according to claim 3, wherein the insulating spacer is conical.

5. The liquid level sensor according to claim 1, wherein the outer capacitor tube comprises a plurality of beams, each beam having a beam base attached to the probe foot, the plurality of beam bases thereby constituting the outer capacitor tube base, and each beam leaving a space with the adjacent beams for allowing the liquid to enter the capacitor region.

6. The liquid level sensor according to claim 1, wherein the outer capacitor tube base and the probe foot are separated by an outer minimum distance (od).

7. The liquid level sensor according to claim 6, wherein the insulating minimum distance (id) and the outer minimum distance (od) have the same value and the inner and outer capacitor tubes are concentric cylinders.

8. The liquid level sensor according to claim 1, wherein the outer capacitor tube is attached to the inner capacitor tube by means of at least one transversal insulating means which crosses the inner capacitor tube.

9. The liquid level sensor according to claim 1, wherein the insulating minimum distance (id) is equal to or greater than 6 mm.

10. The liquid level sensor according to claim 1, wherein the probe foot comprises a housing, and electronic means disposed in the housing for determining capacitance of the capacitor region and thus liquid level, the electronic means being electronically connected to the inner capacitor tube and to the outer capacitor tube.

11. A liquid fuel tank for an aircraft, the fuel tank comprising the liquid level sensor according to claim 1, the fuel tank extending in the elevation direction from a bottom wall up to a top level area, the bottom wall having a surface that is first covered with the liquid when the liquid is introduced in the fuel tank, wherein the probe foot is located on the bottom wall.

12. An aircraft comprising the fuel tank according to claim 11, the bottom wall of the fuel tank being closer than the top level area to an extended landing gear of the aircraft in an elevation direction of the aircraft.

13. The aircraft of claim 12, wherein the aircraft is a rotorcraft.

14. The liquid level sensor according to claim 1 wherein the probe foot is configured to extend outside of the fuel tank.

15. The liquid level sensor according to claim 1 wherein the outer capacitor tube is attached to the inner capacitor tube by at least one transversal insulator which crosses the inner capacitor tube, the insulator being located above the at least one draining hole.

16. The liquid level sensor according to claim 1 wherein the probe foot extends laterally beyond the outer capacitor tube, and the outer capacitor tube base and the probe foot are separated by an outer minimum distance.

17. A liquid fuel tank for an aircraft, the fuel tank comprising a fuel tank body and the liquid level sensor according to claim 1 attached to the fuel tank body.

18. The fuel tank according to claim 17 wherein the probe foot of the liquid level sensor extends outside of the fuel tank body.

19. The fuel tank according to claim 17 wherein the liquid level sensor further comprises at least one transversal insulator that attaches together the outer capacitor tube and the inner capacitor tube and that crosses the inner capacitor tube, the insulator being located above the at least one draining hole.

20. The fuel tank according to claim 17 wherein the liquid level sensor does not extend through a top area of the fuel tank body.

* * * * *